(12) United States Patent
Cen et al.

(10) Patent No.: US 12,710,078 B2
(45) Date of Patent: Aug. 18, 2026

(54) SELF-LOCKING MECHANISM, MOTOR, AND LINEAR ACTUATOR

(71) Applicant: ZHEJIANG JIECANG LINEAR MOTION TECHNOLOGY CO., LTD., Shaoxing (CN)

(72) Inventors: Yujie Cen, Shaoxing (CN); Shiyi Tang, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 426 days.

(21) Appl. No.: 18/286,885

(22) PCT Filed: Jun. 27, 2022

(86) PCT No.: PCT/CN2022/101494

§ 371 (c)(1),
(2) Date: Oct. 13, 2023

(87) PCT Pub. No.: WO2023/279999

PCT Pub. Date: Jan. 12, 2023

(65) Prior Publication Data

US 2024/0200626 A1 Jun. 20, 2024

(30) Foreign Application Priority Data

Jul. 7, 2021 (CN) ......................... 202110765776.2

(51) Int. Cl.
*F16D 49/20* (2006.01)
*F16D 49/02* (2006.01)
*F16H 25/24* (2006.01)

(52) U.S. Cl.
CPC .............. *F16D 49/20* (2013.01); *F16D 49/02* (2013.01); *F16H 2025/2463* (2013.01)

(58) Field of Classification Search
CPC ......... F16H 25/2454; F16H 2025/2463; F16D 2121/24; F16D 2121/26
See application file for complete search history.

(56) References Cited

U.S. PATENT DOCUMENTS 4,646,888 A * 3/1987 Higuchi ................ F16D 41/206 192/223.4
8,528,706 B2 * 9/2013 Wu ........................ H02K 7/102 267/155

(Continued)

FOREIGN PATENT DOCUMENTS

CN 2745326 Y 12/2005
CN 205841579 U 12/2016

(Continued)

OTHER PUBLICATIONS

Oct. 2, 2024 extended Search Report issued in European Patent Application No. 22836753.8.

(Continued)

*Primary Examiner* — James J Taylor, II
(74) *Attorney, Agent, or Firm* — Oliff PLC

(57) ABSTRACT

A self-locking mechanism, a motor, and a linear actuator, which relate to the field of self-locking mechanisms and have a stable self-locking performance. The self-locking mechanism includes a friction ring and a mounting seat fixed relative to the friction ring, a notch being provided on the friction ring, the friction ring being sleeved over a rotary body to be braked, a mounting portion for mounting the friction ring being defined on the mounting seat, the mounting seat pressing the friction ring towards the notch to apply a braking force against the rotary body.

14 Claims, 5 Drawing Sheets

(56) References Cited

U.S. PATENT DOCUMENTS

| | | | | |
|---|---|---|---|---|
| 10,835,346 | B2 * | 11/2020 | Bellows | F16M 13/027 |
| 11,411,464 | B2 * | 8/2022 | Kuhn | H02K 7/102 |
| 2005/0072257 | A1 | 4/2005 | Shimanek | |
| 2019/0128353 | A1 | 5/2019 | Al-Mahshi | |

FOREIGN PATENT DOCUMENTS

| | | | |
|---|---|---|---|
| CN | 110307314 | A | 10/2019 |
| CN | 110671477 | A | 1/2020 |
| CN | 110725868 | A | 1/2020 |
| CN | 210830484 | U | 6/2020 |
| CN | 111810603 | A | 10/2020 |
| CN | 212131116 | U | 12/2020 |
| CN | 212330344 | U | 1/2021 |
| CN | 113651271 | A | 11/2021 |
| CN | 113653782 | A | 11/2021 |
| CN | 215634557 | U | 1/2022 |
| CN | 215861421 | U | 2/2022 |
| DE | 103 49 182 | B3 | 6/2005 |
| DE | 10 2010 043 320 | A1 | 5/2012 |
| JP | H08-042657 | A | 2/1996 |

OTHER PUBLICATIONS

Sep. 2, 2022 Office Action issued in Chinese Patent Application No. 202110765776.2.

Sep. 23, 2022 International Search Report issued in International Patent Application No. PCT/CN2022/101494.

Dec. 14, 2023 International Preliminary Report on Patentability issued in International Patent Application No. PCT/CN2022/101494.

Oct. 31, 2022 Supplementary Search Report issued in Chinese Patent Application No. 202110765776.2.

Nov. 14, 2022 Notice of Allowance issued in Chinese Patent Application No. 202110765776.2.

Jun. 22, 2026 Office Action issued in European Patent Application No. 22836753.8.

* cited by examiner 210
203
230
201
200
120
110
240
100
202

Fig,5

SELF-LOCKING MECHANISM, MOTOR, AND LINEAR ACTUATOR

FIELD

The subject matter described herein relates to the field of self-locking mechanisms, and more particularly relates to a self-locking mechanism, a motor, and a linear actuator.

BACKGROUND

A typical electric lifting column is self-locked via self-locking of an actuator, self-locking of a lead screw, or self-locking of a torsion spring. The self-locking of an actuator is implemented such that a lead angle of worm-worm gear drive is smaller than an equivalent friction angle. A typical worm material is 40Cr and a typical worm gear material is POM100P; they generate a friction coefficient ranging from 0.1 to 0.15. In an electric lifting table, a heavier load increases the stress subjected to the worm gear. The increased stress on the worm gear causes reduction of the friction force of the worm gear after the actuator worm gear has served a period of time, leading to deterioration of self-locking performance. It is also the case for the self-locking of a torsional spring. The torsion spring seat is made of POM100P and is stressed together with the metallic torsion spring; after having served a period of time, the torsional spring seat's friction coefficient will be lowered, also leading to deterioration of self-locking performance.

SUMMARY

To overcome the above and other drawbacks in conventional technologies, embodiments of the disclosure provide a self-locking mechanism that has a stable self-locking performance.

The disclosure adopts a technical solution below:

A self-locking mechanism, comprising a friction ring and a mounting seat fixed relative to the friction ring, a notch being provided on the friction ring, the friction ring being sleeved over a rotary body to be braked, a mounting portion for mounting the friction ring being defined on the mounting seat, the mounting seat pressing the friction ring towards the notch to apply a braking force against the rotary body.

Based on the technical solution above, the self-locking mechanism further comprises a limiting structure configured to limit circumferential rotation of the friction ring relative to the mounting seat.

Based on the technical solution above, the limiting structure comprises a snap-fit groove provided on the mounting portion and a raised edge provided on the friction ring, the raised edge being snapped in the snap-fit groove.

Based on the technical solution above, the raised edge for being snapped in the snap-fit groove is provided at two ends of the friction ring, respectively.

Based on the technical solution above, the raised edge is provided at one of two ends of the friction ring.

Based on the technical solution above, a plurality of raised edges are provided at intervals along an outer periphery of the friction ring, and the mounting portion is provided with a plurality of snap-fit grooves corresponding to the raised edges.

Based on the technical solution above, a mounting groove for accommodating the friction ring is defined on the mounting portion, and a snap joint for limiting the friction ring in the mounting groove is further provided on the mounting portion.

Based on the technical solution above, the mounting portion comprises a base of an annular shape and a plurality of brackets disposed at intervals along a circumferential direction of the base, the plurality of brackets being connected via a chassis to form the mounting portion.

A motor comprises a drive shaft and the self-locking mechanism as noted supra, the self-locking mechanism being configured to brake the drive shaft.

A linear actuator comprises the motor as described supra.

The disclosure offers the following benefits:

The self-locking mechanism described herein is configured such that the mounting seat and the friction ring are fixed relative to each other, the friction ring is sleeved over the rotary body, and a clearance is reserved between two ends of the friction ring, i.e., the notch defined by the two ends of the friction ring allows for the inside diameter of the friction ring to vary under an external acting force, so that when being pressed by the mounting seat, the friction ring has its inside diameter shrunk towards the direction of the notch to closely engage with the rotary body; as such, the friction ring may apply an acting force on the rotary body (the acting force refers to a sliding friction force generated between the rotating rotary body and the friction ring) to block rotation of the rotary body, whereby the rotary body can be quickly stopped; when the rotary body maintains static, a static self-locking force is formed between the friction ring and the rotary body; in this way, dynamic/static self-locking may be achieved, giving the self-locking mechanism a stable self-locking performance;

- the mounting seat and the friction ring are two standalone structures; a worn friction ring affects the self-locking performance of the self-locking mechanism; the normal self-locking performance of the self-locking mechanism may be recovered by replacing the friction ring; therefore, the self-locking mechanism according to the disclosure is convenient in use;
- upon mounting, the notch of the friction ring allows for easy expansion of the inside diameter of the friction ring, which facilitates mounting of the friction ring on the rotary body; then, the mounting seat and the friction ring are assembled. In an existing self-locking mechanism, its friction part and the rotary body are generally interference-fitted, so that during the procedure of assembling the friction part and the rotary body, wear and burrs easily occur to the rotary body, which causes annoying noise when the self-locking mechanism performs braking. In contrast, the self-locking mechanism as disclosed herein provides a better protection to the rotary body during the assembly procedure, without causing annoying noise.

Furthermore, the self-locking mechanism further comprises a limiting structure configured to limit circumferential rotation of the friction ring relative to the mounting seat. With the limiting structure, the friction ring can maintain static relative to the mounting seat, unable to rotate synchronously along with the rotary body; when the rotary body rotates normally, a sliding friction force is formed therebetween, so that when it is needed to stop the rotary body, the sliding friction force may quickly stop the rotary body.

Furthermore, the limiting structure comprises a snap-fit groove provided on the mounting portion and a raised edge provided on the friction ring, the raised edge being snapped in the snap-fit groove. Rotation of the friction ring may be limited by snapping the raised edge into the snap-fit groove. It is easy to fit the raised edge with the snap-fit groove, i.e., aligning the raised edge to the snap-fit groove and then pressing the raised edge, which does not increase the assembly difficulty of the self-locking mechanism; moreover, fitting between the snap-fit groove and the raised edge has a function of locating; after they are fitted, the inside diameter of the friction ring may be directly reduced, thereby guaranteeing close engagement between the friction ring and the rotary body. If the snap-fit groove is provided on the friction ring and the raised edge is provided on the mounting seat, the friction ring will have a non-uniform thickness; since the friction ring is required to be deformable to a certain extent, the fitting between the snap-fit groove and the raised edge cannot be interference-fitting, and a clearance is left therebetween such that the friction ring is deformed under the action of friction force; particularly at the position where the snap-fit groove is provided, the thinner thickness results in a larger deformation amount, such that crack easily occurs.

Furthermore, the raised edge for being snapped in the snap-fit groove is provided at two ends of the friction ring, respectively. Fitting between the raised edge and the snap-fit groove limits the deformation extent of the friction ring towards the direction of the notch at the position where the friction ring is connected to the raised edge; since both ends of the friction ring are provided with the raised edge, the deformation amount of the width of the notch is limited when the rotary body is rotating, which avoids the overly large width of the notch due to the friction force between the rotary body and the friction ring from causing deterioration of the braking force; moreover, since both ends of the friction ring are provided with the raised edge, the braking forces subjected to the rotary body are the same irrespective of whether the rotary body rotates forward or reversely, thereby realizing two-way self-locking to the rotary body.

Furthermore, the raised edge is provided at one of the two ends of the friction ring. Fitting between the raised edge and the snap-fit groove limits the deformation extent of the friction ring towards the direction of the notch at the position where the friction ring is connected to the raised edge; as such, the deformation extent of the end, where the raised edge is provided, of the two ends of the friction will be limited, while the other end is deformed more easily towards the direction distant from the notch; when the rotary body rotates towards the end with the raised edge, the friction ring has a less inside-diameter change, and a greater friction force is generated between the friction ring and the rotary body; when the rotary body rotates towards the opposite direction, the friction ring has a greater inside-diameter change, and a smaller friction force is generated; as such, one-way self-locking to the rotary body may be realized.

Furthermore, a plurality of raised edges are provided at intervals along an outer periphery of the friction ring, and the mounting portion is provided with a plurality of snap-fit grooves corresponding to the raised edges. Each raised edge may limit the deformation amount of the friction ring; provision of the raised edges at intervals limits the overall deformation amount of the friction ring and reduces the width change of the notch when the rotary body is rotating, which may maintain a good self-locking performance, whereby two-way self-locking to the rotary body is implemented.

Furthermore, a mounting groove for accommodating the friction ring is defined on the mounting portion, and a snap joint for limiting the friction ring in the mounting groove is further provided on the mounting portion. Fitting between the snap joint and the mounting groove may limit displacement of the friction ring in the axial direction of the rotary body, preventing disengagement of the friction ring from the mounting seat affecting the braking performance; moreover, by limiting the friction ring with the snap joint, assembly between the friction ring and the mounting seat is facilitated, without a need of manipulating the snap joint during the assembly procedure; only by forcibly pressing the friction ring towards the mounting groove, the assembly is done.

Furthermore, the mounting portion comprises a base of an annular shape and a plurality of brackets disposed at intervals along a circumferential direction of the base, the plurality of brackets being connected via a chassis to form the mounting portion. Provision of an interval between two neighboring brackets allows for the brackets to shift by a predetermined angle relative to the base, thereby being capable of better fitting with the rotary body; moreover, the mounting seat of this structure allows the base to have a predetermined deformation amount, which may facilitate mounting the mounting seat to the equipment.

The disclosure further provides a motor, which outputs a force via a drive shaft; in addition, the motor comprises the self-locking mechanism described supra; the motor may produce a braking force against the drive shaft, such that the drive shaft, when rotating normally, may overcome the friction force between itself and the friction ring; when the motor needs stop, the braking force of the self-locking mechanism may quickly stop the drive shaft from rotating, whereby accuracy of the motor may be enhanced.

The disclosure further provides a linear actuator. The motor as noted supra is provided in the linear actuator; the motor provides a linear force for the linear actuator. The linear actuator is generally applied to control lift of lifting equipment; if the linear actuator as described herein is provided in the lifting equipment, the lifting equipment, when bearing a load, can maintain stability under the action of the self-locking force of the self-locking mechanism, which does not easily retract under an external force; moreover, the lifting/lowering height of the lifting equipment may also be accurately controlled.

These features and advantages of the disclosure will be disclosed in detail through specific implementations described below with reference to the accompanying drawings.

BRIEF DESCRIPTION OF THE DRAWINGS

Hereinafter, the disclosure will be further described with reference to the accompanying drawings.

Figure 1:
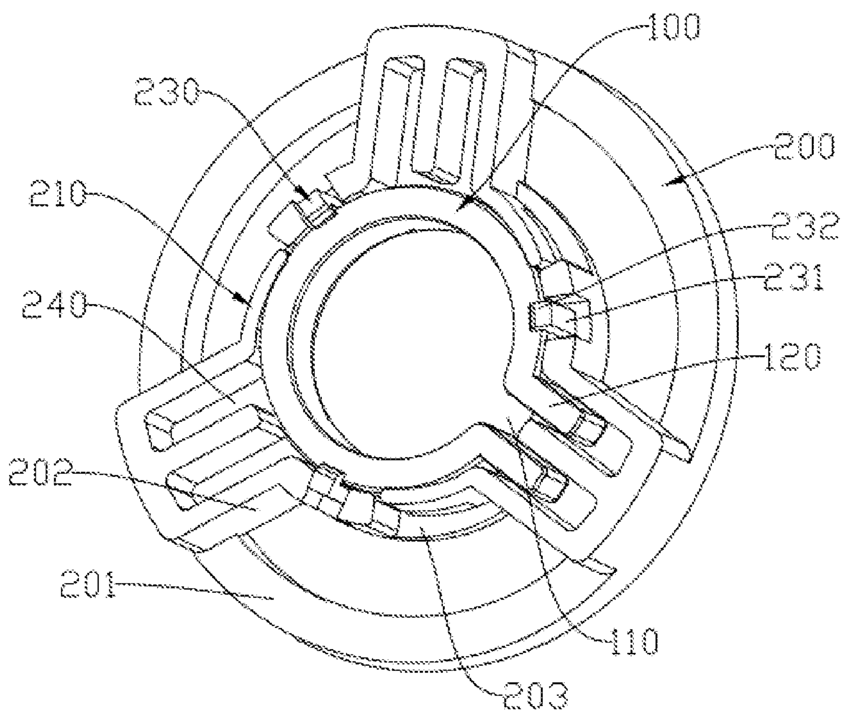
FIG. 1 is schematic diagram A of a self-locking mechanism in some example embodiments of the disclosure.

REFERENCE NUMERALS friction ring 100; notch 110; raised edge 120;

mounting seat 200; base 201; bracket 202; chassis 203, mounting portion 210; mounting groove 220; snap joint 230; elastic strip 231; snap hook 232; snap-fit groove 240;

drive shaft 300; housing 310; end cap 320; snap block 330; snap-fit groove 340.

DETAILED DESCRIPTION

Hereinafter, the technical solutions of the disclosure will be explained and illustrated through embodiments with reference to the accompanying drawings. However, the embodiments are only preferred embodiments of the disclosure, not all of them. Other embodiments derived by those skilled in the art without exercise of inventive work based on the examples in the embodiments all fall within the protection scope of the disclosure.

In the description of the disclosure, it needs to be understood that the orientational or positional relationships indicated by the terms "center," "longitudinal," "transverse," "length," "width," "thickness," "upper," "lower," "front," "rear," "left," "right," "vertical," "horizontal," "top," "bottom," "inner," "clockwise," and "counterclockwise" refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

Besides, the terms "first" and "second" are only used for descriptive purposes, which shall not be construed as indicating or implying relative importance or implicitly indicating the number of a referred to technical feature. Therefore, the features limited by "first" and "second" may explicitly or implicitly include one or more of such features. In the description of the present disclosure, unless otherwise indicated, "plurality" indicates two or above.

In the disclosure, unless otherwise explicitly provided and limited, the terms such as "mount," "connect," "attach," and "fix" should be understood broadly, which, for example, may refer to a fixed connection, a detachable connection, or an integrated connection; which may be a mechanical connection or an electrical connection; which may be a direct connection or an indirect connection via an intermediate medium; which may also be a communication between the insides of two elements. To a person of normal skill in the art, specific meanings of the above terms in the disclosure may be construed based on specific situations.

In the disclosure, unless otherwise explicitly provided and limited, an expression that a first feature is "above" or "below" a second feature may refer to a direct contact between the first feature and the second feature or may refer to a scenario where although the first feature and the second feature do not contact directly, they contact via a further feature therebetween. Moreover, the expression that the first feature is "above" or "over" or "on" the second feature refers to a situation where the first feature is exactly or generally over the second feature or only refers to a situation that the horizontal height of the first feature is higher than the second feature. The expression that the first feature is "under" or "below" or "beneath" the second feature refers to a situation where the first feature is exactly or generally below the second feature or only refers to a situation that the horizontal height of the first feature is lower than the second feature.

Referring to FIG. 1, embodiments of the disclosure disclose a self-locking mechanism, comprising a friction ring 100 and a mounting seat 200 fixed relative to the friction ring 100, a notch 110 being provided on the friction ring 100, the friction ring 100 being sleeved over a rotary body to be braked, a mounting portion 210 for mounting the friction ring 100 being defined on the mounting seat 200; the mounting portion 210 pressing the friction ring 100 towards the notch 110 to apply a braking force against the rotary body.

The self-locking mechanism described herein is configured such that the mounting seat 200 and the friction ring 100 are fixed relative to each other, the friction ring 100 is sleeved over the rotary body, and a clearance is reserved between two ends of the friction ring, i.e., the notch 110 is defined by two ends of the friction ring 100. The notch 110 allows for the inside diameter of the friction ring 100 to vary under an external acting force, so that when being pressed by the mounting seat 200, the friction ring 100 has its inside diameter shrunk towards the direction of the notch 110 to closely engage with the rotary body; as such, the friction ring 100 may apply an acting force on the rotary body (the acting force refers to a sliding friction force generated between the rotating rotary body and the friction ring 100) to block rotation of the rotary body, whereby the rotary body can be quickly stopped; when the rotary body maintains static, a static self-locking force is formed between the friction ring 100 and the rotary body; in this way, dynamic/static self-locking may be achieved, giving the self-locking mechanism a stable self-locking performance; in addition, the notch 110 may be also be configured for oil storage, which extends the service life of the friction ring 100 and reduces wear to the friction ring 100;

the mounting seat 200 and the friction ring 100 are two standalone structures; a worn friction ring 100 affects the self-locking performance of the self-locking mechanism; the normal self-locking performance of the self-locking mechanism may be recovered by replacing the friction ring 100; therefore, the self-locking mechanism according to the disclosure is convenient to use. In some implementations, a material of the mounting seat 200 selects as Poly(ether-ether-ketone) (PEEK) or Polyphenylene sulfide (PPS), and a material of the friction ring 100 selects PEEK, whereby the mounting seat 200 and the friction ring 100 are high-temperature resistant, so that the friction coefficient of the self-locking mechanism will not be deteriorated due to elevated temperature during operating of the self-locking mechanism, thereby maintaining a stable self-locking performance;

upon mounting, the notch 110 of the friction ring 100 allows for easy expansion of the inside diameter of the friction ring 100, which facilitates mounting of the friction ring 100 on the rotary body; then, the mounting seat 200 and the friction ring 100 are assembled. In an existing self-locking mechanism, its friction part and the rotary body are generally interference-fitted, so that during the procedure of assembling the friction part and the rotary body, wear and burrs easily occur to the rotary body, which causes annoying noise when the self-locking mechanism performs braking. In contrast, the self-locking mechanism as disclosed herein provides a better protection to the rotary body during the assembly procedure, without causing annoying noise.

A mounting groove 220 for accommodating the friction ring 100 is defined on the mounting portion 210. The mounting groove 220 is a circular groove, with the bottom wall in the center being through, so as to facilitate the rotary body to pass through the mounting seat 200; a snap joint 230 circumferentially disposed along the mounting groove 220 is further provided on the mounting portion 210, the snap joint 230 being capable of limiting the friction ring 100 in the mounting groove 220, so that the friction ring 100 is non-movable along the axial direction of the rotary body, which prevents disengagement of the friction ring 100 from the mounting seat 200 affecting the braking performance.

The snap joint 230 is one-piece formed with the mounting seat 200, which eliminates a need of first removing the snap joint 230 before mounting the friction ring 100 on the mounting seat 200; instead, the mounting may be done simply by forcibly pressing the friction ring 100 towards the direction of the mounting groove 220, whereby the assembly procedure is facilitated and it is also convenient to replace the worn friction ring 100.

In some implementations, the snap joint 230 comprises an elastic strip 231 deformable towards the radial direction of the mounting groove 220 and a snap hook 232 provided at an end portion of the elastic strip 231; upon mounting, the friction ring 100 is first aligned to the mounting groove 220 and then pressed towards the mounting groove 220; during this procedure, the friction ring 100 pushes the snap hook 232 so that the elastic strip 231 is first deformed towards the direction distant from the mounting groove 220; when the friction ring 100 enters the mounting groove 220, the elastic strip 231 and the snap hook 232 are reset, whereby the snap hook 232 catches the friction ring 100, limiting axial displacement of the friction ring 100 in the mounting groove 220.

Figures 3, 4:
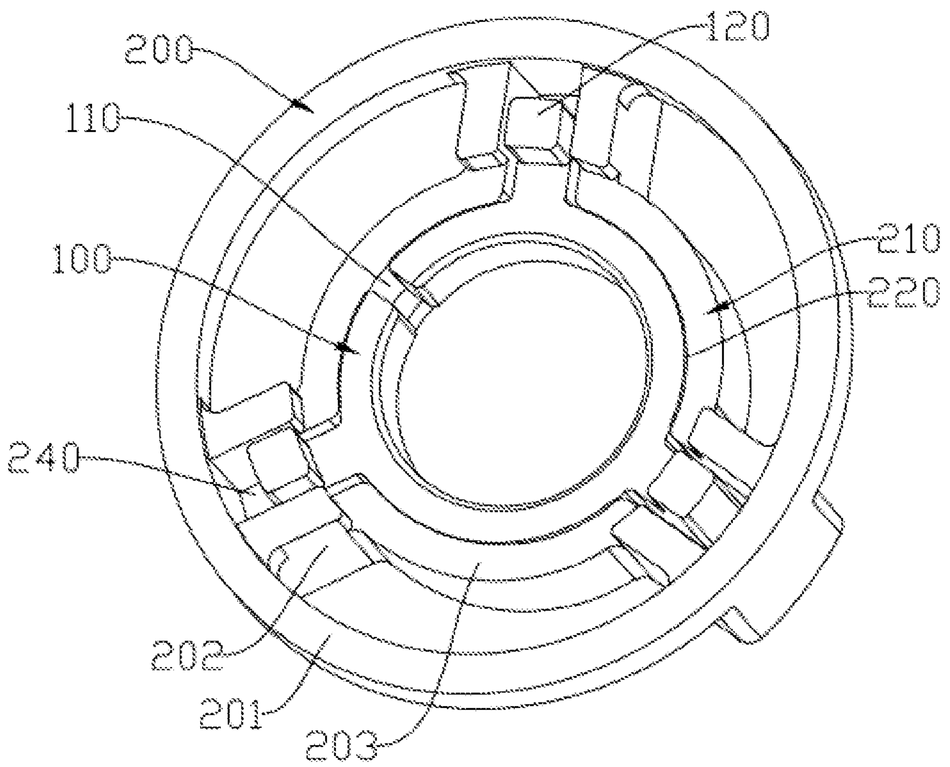
FIG. 3 is schematic diagram C of a self-locking mechanism in some example embodiments of the disclosure.
FIG. 4 is schematic diagram D of a self-locking mechanism in some example embodiments of the disclosure.

Referring to FIG. 4, alternatively, the snap joint 230 is an L-shaped snap block, which is hardly deformed and provides a higher strength in limiting the friction ring 100 circumferentially, thereby offering a better self-locking performance.

Referring to FIG. 1, based on the example embodiment described supra, in another example embodiment of the disclosure, a specific structure of a limiting structure is specifically illustrated.

The limiting structure comprises a snap-fit groove 240 provided on the mounting portion 210 and a raised edge 120 provided on the friction ring 100, the raised edge 120 being snapped into the snap-fit groove 240.

Rotation of the friction ring 100 may also be limited by snapping the raised edge 120 into the snap-fit groove 240. It is easy to fit the raised edge 120 with the snap-fit groove 240, i.e., aligning the raised edge 120 to the snap-fit groove 240 and then pressing the raised edge 120, which does not increase the assembly difficulty of the self-locking mechanism; moreover, fitting between the snap-fit groove 240 and the raised edge 120 has a function of locating; after they are fitted, the inside diameter of the friction ring 100 may be directly reduced, thereby guaranteeing close engagement between the friction ring 100 and the rotary body.

If the snap-fit groove is provided on the friction ring and the raised edge is provided on the mounting seat, the friction ring will have a non-uniform thickness; since the friction ring is required to be deformable to a certain extent, the fitting between the snap-fit groove and the raised edge cannot be interference-fitting, and a clearance is left therebetween such that the friction ring is deformed under the action of friction force; particularly at the position where the snap-fit groove is provided, the thinner thickness results in a larger deformation amount, such that crack easily occurs.

Based on the example embodiments described supra, in another example embodiment:

the self-locking mechanism is capable of two-way self-locking the rotary body.

Referring to FIG. 1, specifically, a raised edge 120 for being snapped in the snap-fit groove 240 is provided at both ends of the friction ring 100; fitting between the raised edge 120 and the snap-fit groove 240 limits the deformation extent of the friction ring 100 towards the direction of the notch 110 at the position where the friction ring 100 is connected to the raised edge 120; since both ends of the friction ring 100 are provided with the raised edge 120, the deformation amount of the width of the notch 110 is limited when the rotary body is rotating, which avoids the overly large width of the notch 110 due to the friction force between the rotary body and the friction ring 100 from causing deterioration of the braking force; moreover, since both ends of the friction ring 100 are provided with the raised edge 120, the braking forces subjected to the rotary body are the same irrespective of whether the rotary body rotates forward or reversely, thereby realizing two-way self-locking to the rotary body.

Referring to FIG. 3, alternatively, a plurality of raised edges 120 are provided at intervals along an outer periphery of the friction ring 100, and a plurality of snap-fit grooves 240 corresponding to the plurality of raised edges 120 are provided on the mounting portion 210; when the raised edges 120 and the snap-fit grooves 240 are fitted in one-to-one correspondence, each raised edge 120 may limit the deformation amount of the friction ring 100; provision of the raised edges 120 at intervals limits the overall deformation amount of the friction ring 100; in this way, the deformation extent of the notch 110 will not be too large irrespective of whether the rotary body rotates forward or reversely, whereby two-way self-locking to the rotary body is implemented.

Additionally, the self-locking mechanism may also implement one-way self-locking to the rotary body.

Figure 2:
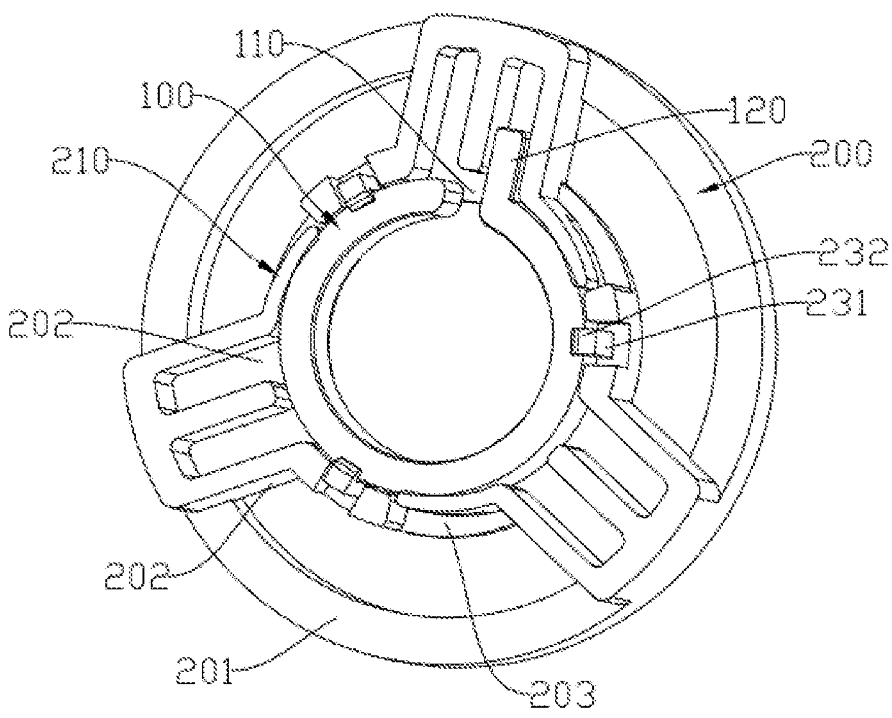
FIG. 2 is schematic diagram B of a self-locking mechanism in some example embodiments of the disclosure.

Referring to FIG. 2, specifically, the raised edge 120 is provided at one of the two ends of the friction ring 100, which limits the deformation extent of that end, while the other end is easily deformed when being driven by the friction force, i.e., the two ends of the friction ring 100 form a free end and a fixed end, respectively; when the rotary body rotates towards the fixed end, the free end of the friction ring 100 will approach to the fixed end under the action of the friction force, which may increase the magnitude of friction force; when the rotary body rotates towards the free end, the free end moves away from the fixed end under the action of the friction force, which will lower the friction force, such that the rotating rotary body meets less resistance, whereby one-way self-locking to the rotary body may be implemented.

Figure 5:
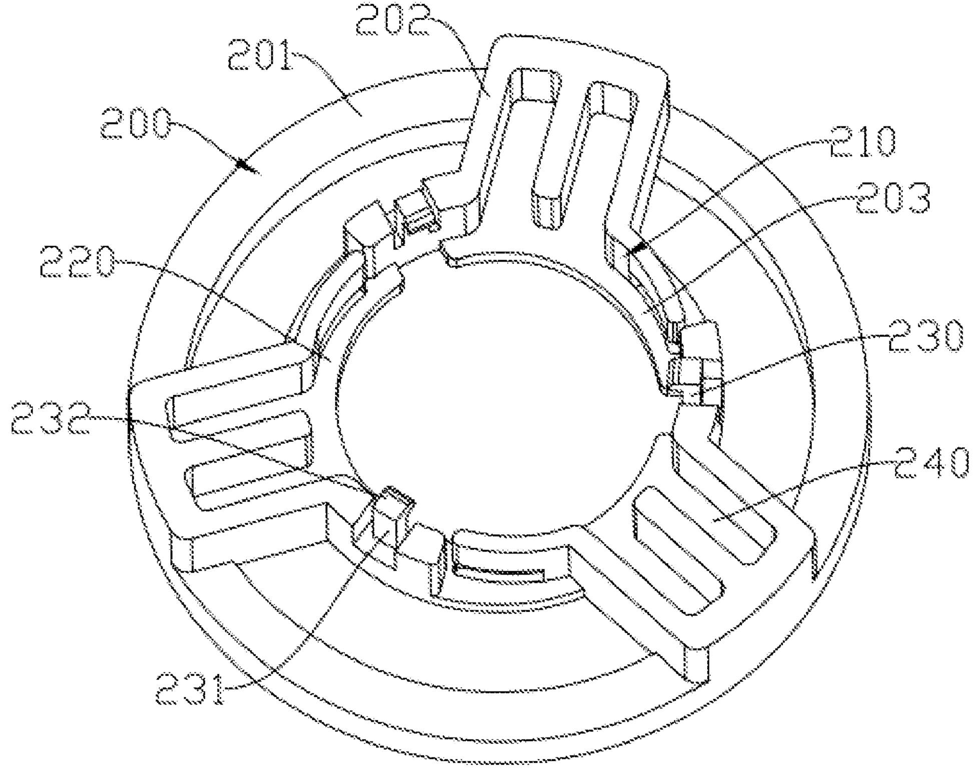
FIG. 5 is a structural schematic diagram of a mounting seat in some example embodiments of the disclosure.

Referring to FIG. 5, in another example embodiment of the disclosure, the mounting seat 200 comprises a base 201 of an annular shape and a plurality of brackets 202 disposed at intervals along the periphery of the base 201, the plurality of brackets 202 being connected via a chassis 203 to form a mounting portion 210; provision of an interval between two neighboring brackets 202 allows for the brackets 202 to shift by a predetermined angle relative to the base 201, thereby being capable of better fitting with the rotary body; moreover, the mounting seat 200 of this structure allows the base 201 to have a predetermined deformation amount, which may facilitate mounting the mounting seat 200 to the equipment.

Figure 6:
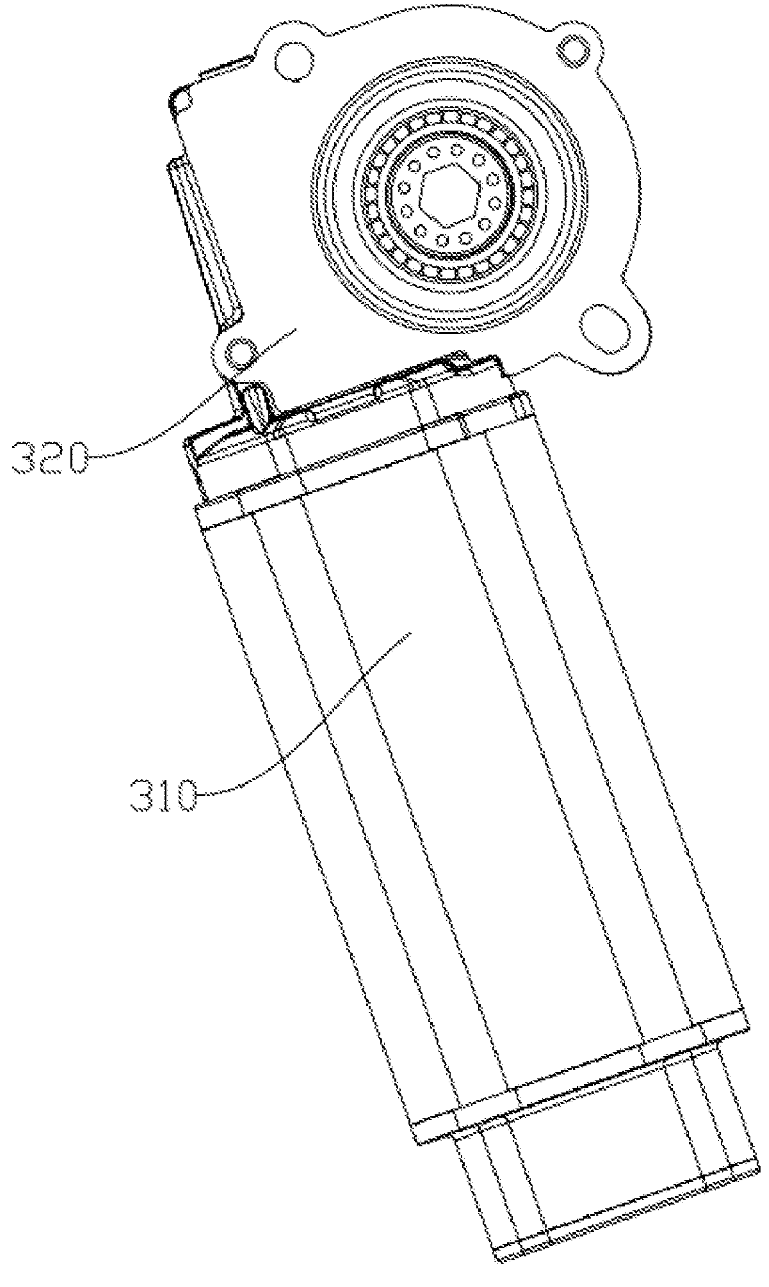
FIG. 6 is a structural schematic diagram of a motor in some example embodiments of the disclosure.
Figure 7:
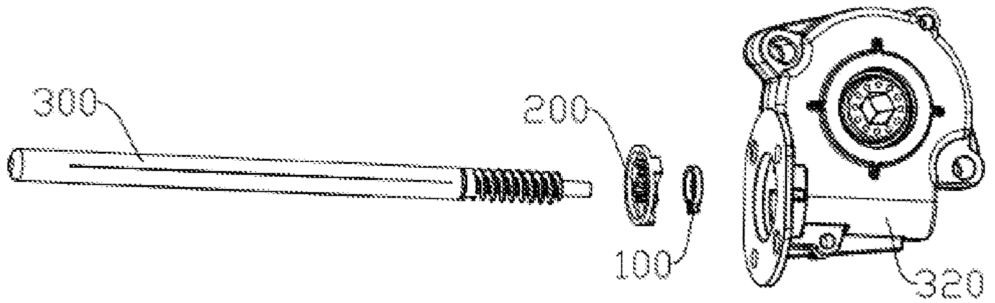
FIG. 7 is an exploded view of a motor in some example embodiments of the disclosure.
Figure 8:
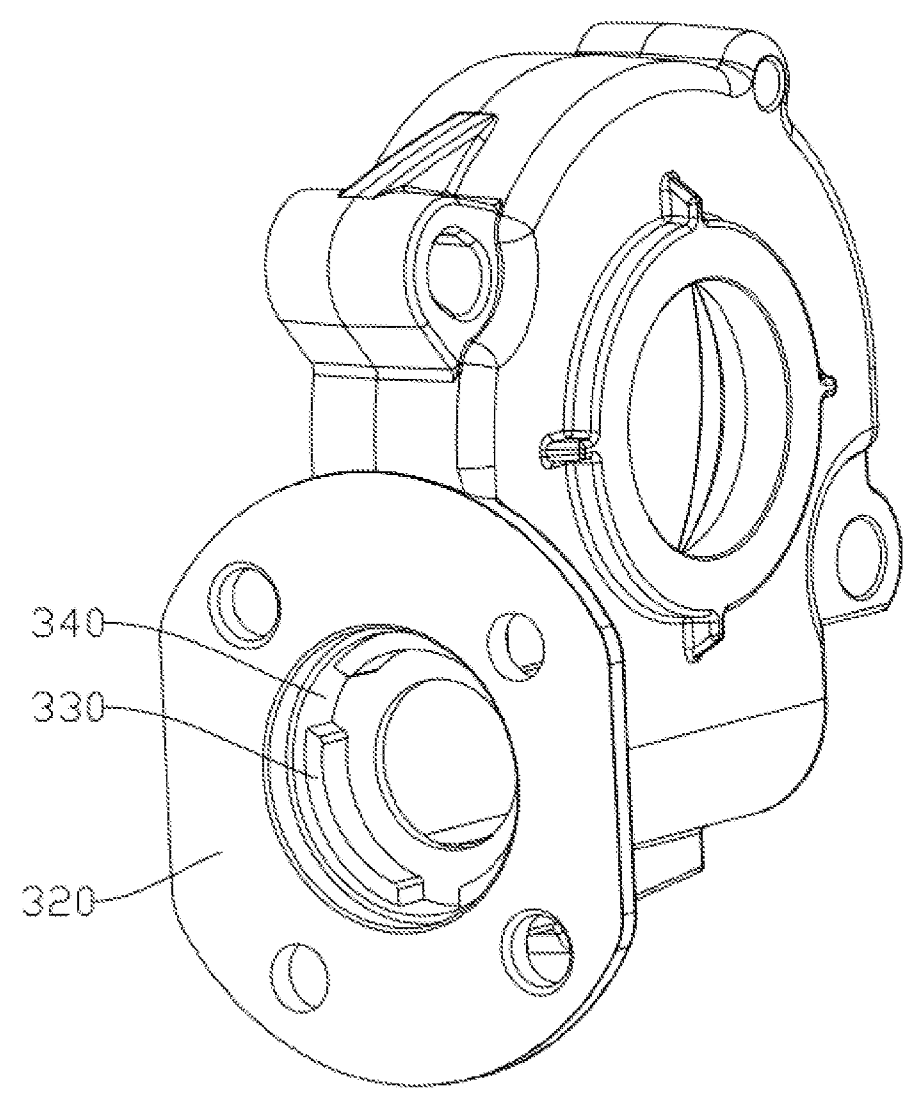
FIG. 8 is a structural schematic diagram of an end cap in some example embodiments of the disclosure.

Referring to FIGS. 6 to 8, embodiments of the disclosure further provide a motor comprising a drive shaft 300 and a housing 310; a rotary force generated by the motor is outputted by the drive shaft 300; the self-locking mechanism described supra to perform self-locking to the drive shaft 300 is disposed in the motor. An end cap 320 is fixedly mounted at an end of the housing 310, a plurality of protruding snap blocks 330 are provided in the end cap 320, and a snap-fit groove 340 is formed between two neighboring snap blocks 330, the mounting portion 210 being snapped in the snap-fit groove 340 so that circumferential rotation of the mounting seat 200 is limited by the snap blocks 330; the friction ring 100 is sleeved over the drive shaft 300, so that when the drive shaft 300 rotates normally, the drive shaft 300 may overcome the friction force between itself and the friction ring 100; in this case, to stop the motor, the braking force of the self-locking mechanism may stop rotation of the drive shaft 300 quickly, whereby motor accuracy and sensitivity may be improved.

Embodiments of the disclosure further disclose a linear actuator, comprising the motor described supra and a telescopic column driven by the motor to act. The linear actuator can produce a linear force, driving an object to move linearly via the telescopic column. The linear actuator is generally applied to control lift of lifting equipment such as a lifting table, a lifting bed, etc.; with the self-locking mechanism provided in the motor, the lifting equipment, when bearing a load, does not easily retract under an external force, maintaining structural stability of the lifting equipment; meanwhile, due to control sensitivity of the motor, the linear actuator may accurately control the extension/retraction extent of the lifting equipment.

A typical telescopic column has an extension/retraction speed of 35 mm/s, and the internal lead screw has a lead of 10+10. Due to the small lead of the lead screw, the conventional telescopic column is self-locked by a combination of the actuator, the torsional spring, and the lead screw. In a case where the extension/retraction speed of the conventional telescopic column increases to 80 mm/s~150 mm/s or the lead of the conventional telescopic column increases till 4 times the static self-locking, if the self-locking is still implemented by the combination of the actuator, the torsional spring, and the lead screw, the increased speed results in acceleration of the motor rotation, and the noise becomes larger. If the lead of the lead screw is changed to 20+20, due to deterioration of the self-locking force of the lead screw, the self-locking performance of the loaded table is also deteriorated. In contrast, the motor in the linear actuator adopts the self-locking mechanism as described herein, with the same overall load of the lifting equipment, self-locking performance of the loaded table may be enhanced in a case where the lead of the lead screw increases or the torsional spring is eliminated.

What have been described above are only embodiments of the disclosure; however, the protection scope of the disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

The invention claimed is:

1. A self-locking mechanism, comprising a friction ring, a notch being provided on the friction ring, a mounting seat fixed relative to the friction ring, the friction ring being configured to be sleeved over a rotary body to be braked, the mounting seat being configured to press the friction ring towards the notch to apply a braking force against the rotary body, and a limiting structure configured to limit circumferential rotation of the friction ring relative to the mounting seat, wherein the limiting structure comprises snap-fit grooves provided on the mounting seat, a first raised edge provided on the friction ring at one end of the friction ring for being snapped in one of the snap-fit grooves, and a second raised edge provided on the friction ring at another end of the friction ring for being snapped in another one of the snap-ft grooves.

2. The self-locking mechanism according to claim 1, wherein a mounting groove for accommodating the friction ring is defined on the mounting seat, and a snap joint for limiting the friction ring in the mounting groove is further provided on the mounting seat.

3. The self-locking mechanism according to claim 1, wherein the mounting seat comprises a base of an annular shape and a plurality of brackets disposed at intervals along a circumferential direction of the base, the plurality of brackets being connected via a chassis.

4. A motor, comprising the self-locking mechanism according to claim 1 and a drive shaft, which serves as the rotary body, the self-locking mechanism being configured to brake the drive shaft.

5. A linear actuator, comprising the motor according to claim 4.

6. A self-locking mechanism, comprising:

a friction ring, a notch being provided on the friction ring, a mounting seat fixed relative to the friction ring, the friction ring being configured to be sleeved over a rotary body to be braked, the mounting seat being configured to press the friction ring towards the notch to apply a braking force against the rotary body, and a limiting structure configured to limit circumferential rotation of the friction ring relative to the mounting seat, wherein the limiting structure comprises a plurality of raised edges provided on the friction ring, at intervals along an outer periphery of the friction ring, and a plurality of snap-fit grooves corresponding to the raised edges provided on the mounting seat.

7. The self-locking mechanism according to claim 6, wherein a mounting groove for accommodating the friction ring is defined on the mounting seat, and a snap joint for limiting the friction ring in the mounting groove is further provided on the mounting seat.

8. The self-locking mechanism according to claim 6, wherein the mounting seat comprises a base of an annular shape and a plurality of brackets disposed at intervals along a circumferential direction of the base, the plurality of brackets being connected via a chassis.

9. A motor, comprising the self-locking mechanism according to claim 6 and a drive shaft, which serves as the rotary body, the self-locking mechanism being configured to brake the drive shaft.

10. A linear actuator, comprising the motor according to claim 9.

11. A self-locking mechanism, comprising:

a friction ring, a notch being provided on the friction ring, and a mounting seat fixed relative to the friction ring, the friction ring being configured to be sleeved over a rotary body to be braked, the mounting seat being configured to press the friction ring towards the notch to apply a braking force against the rotary body, wherein a mounting groove for accommodating the friction ring is defined on the mounting seat, and a snap joint for limiting the friction ring in the mounting groove is further provided on the mounting seat.

12. The self-locking mechanism according to claim 11, wherein the mounting seat comprises a base of an annular shape and a plurality of brackets disposed at intervals along a circumferential direction of the base, the plurality of brackets being connected via a chassis.

13. A motor, comprising the self-locking mechanism according to claim 11 and a drive shaft, which serves as the rotary body, the self-locking mechanism being configured to brake the drive shaft.

14. A linear actuator, comprising the motor according to claim 13.

* * * * *